(12) United States Patent
Nagata et al.

(10) Patent No.: US 6,899,555 B2
(45) Date of Patent: May 31, 2005

(54) CARD CONNECTOR

(75) Inventors: Takayuki Nagata, Higashiosaka (JP); Yasuo Nakai, Nara (JP); Akihiro Tanaka, Matsubara (JP)

(73) Assignee: Hosiden Corporation, Yao (JP)

( * ) Notice: Subject to any disclaimer, the term of this patent is extended or adjusted under 35 U.S.C. 154(b) by 0 days.

(21) Appl. No.: 10/780,715

(22) Filed: Feb. 19, 2004

(65) Prior Publication Data

US 2004/0161977 A1 Aug. 19, 2004

(30) Foreign Application Priority Data

Feb. 19, 2003 (JP) ........................................ 2003-041456

(51) Int. Cl.⁷ ............................................... H01R 13/62
(52) U.S. Cl. ...................................... 439/159; 439/630
(58) Field of Search ............................... 439/157–160, 439/630–632

(56) References Cited

U.S. PATENT DOCUMENTS 6,478,591 B1 * 11/2002 Chang ......................... 439/159
6,619,991 B2 * 9/2003 Nishio et al. ................ 439/630
6,648,694 B2 * 11/2003 Takamori et al. ........... 439/630

FOREIGN PATENT DOCUMENTS

| JP | 7-55652 | 12/1995 |
| JP | P2001-118633 A | 4/2001 |
| JP | P3248068 | 11/2001 |

* cited by examiner

*Primary Examiner*—Truc Nguyen
(74) *Attorney, Agent, or Firm*—Bacon & Thomas

(57) ABSTRACT

The invention relates to a card connector, and more particularly to a card connector having a function of half-locking a card 100 such as a memory card inserted into a card insertion space of a case 1, in an extractable state. The invention provides a card connector which exhibits an excellent half-lock performance for a long term, and which, in a card-set state, exhibits an enhanced half-lock performance.

In the card connector of the invention, a slider 3 is attached to the case 1 in a longitudinally movable manner, and the slider 3 is always elastically urged in the card ejecting direction. A half-lock mechanism 5 which engagingly holds the card in an extractable manner is disposed on the slider 3. The half-lock mechanism 5 is formed with being divided into: a movable piece 52 which is configured by a resin-molded member, and which has an engaging projection 51 that engagingly holds the card 100 in an extractable manner; and a metal-made-spring member 55 which elastically urges the movable piece 52 in the direction along which the engaging projection 51 is to be fitted into a recess 110 of the card 100. The card connector further has an auxiliary spring member 70 which, when the slider 3 is at the pushed position, increases the elastic force of the spring member 55.

10 Claims, 9 Drawing Sheets

CARD CONNECTOR

BACKGROUND OF THE INVENTION

1. Field of the Invention

The present invention relates to a card connector, and more particularly to a card connector having a function of half-locking a card such as a memory card inserted into a card insertion space of a case, in an extractable state.

2. Description of the Prior Art

In some of card connectors, a card insertion space is formed by a case having contact pieces corresponding to card terminals, a slider that is to be pushed in by a card inserted into the card insertion space is placed at a position adjacent to the card insertion space, and the slider is elastically urged in a card ejecting direction. Among such card connectors, a card connector having functions of locking the slider pushed by a card to the case, and half-locking the card to the slider is well known.

In a prior art example of card connectors of the this type, a half-lock mechanism for half-locking a card to a slider is formed by a plate spring made of a sheet metal. Such a card connector is configured so that a mountain-like engaging portion is formed by bending a tip end portion of a plate spring which is held by the slider in a cantilevered manner, and the engaging portion rides over a side end face of a card inserted into the card insertion space to be fitted into a recess formed in a side end portion of the card, whereby the card is half-locked to the slider in an extractable manner (for example, see Japanese Patent Application Laying-Open No. 11-135192). In another prior art example, a cam is provided to an end portion of a spring member which is molded of a resin or the like, a card inserted into a card insertion space pushes the cam to displace the spring member, and, after the displacement, the spring member conducts a returning operation to collide against a side wall of a portion accommodating the spring member, thereby generating a click sound, and, on the basis of the click sound, the operator can know the completion of the connection between the card and a connector (for example, see Japanese Utility Model Publication No. 7-55641).

By contrast, a card which is a sue object of a card connector is usually configured so that the outer shell is formed by molding of a resin. In the prior art examples described above, therefore, the engaging portion of the sheet metal made plate spring, and the resin-made cam which are used for half-locking rub against the resin face of the outer shell of the card.

In a further prior art example, a half-lock mechanism for half-locking a card to a slider is formed by a plate spring made of a sheet metal. In the prior art example, when the slider is at a pushed position, the rearward displacement of an engaging portion formed in the tip end of the plate spring is restricted by a side wall face of a case, and, when the slider is at a stand-by position, the engaging portion is placed so as to correspond to an opening formed in the side wall face of the case, whereby the restriction of the rearward displacement of the engaging portion is eliminated, and, when the slider is at the pushed position, the card is prevented from being forcedly extracted (for example, see Japanese Patent Application Laying-Open No. 2001-118633). In the prior art example, during a process of ejecting the card, the card cannot be prevented from popping out because of the elimination of the rearward displacement restriction of the engaging portion in the case where the slider is at the pushed position. In order to cope with this situation, therefore, a free end of an auxiliary plate spring faces to the opening which is formed in the side wall face of the case to eliminate the rearward displacement restriction of the engaging portion, and the free end of the auxiliary plate spring is elastically contacted with the engaging portion, so that the elastic force of the plate spring when the slider is at the stand-by position is increased.

In the prior art example (Japanese Patent Application Laying-Open No. 11-135192), when operations of inserting and ejecting a card are repeated and the engaging portion of the sheet metal made plate spring repeatedly rubs against the resin face of the outer shell of the card, there arises a situation where the outer shell of the card which is made of a resin is shaved off by the engaging portion made of a metal. Therefore, the card holding force exerted by the engaging portion which is fitted into the recess of the card is remarkably reduced, and the half-lock function performed by the half-lock mechanism is impaired in an early stage. As a result, the initial half-lock performance is hardly maintained for a long term.

Therefore, it may be contemplated that the sheet metal made plate spring is replaced with a spring member molded of a resin as in the other prior art example (Japanese Utility Model Publication No. 7-55641), and the engaging portion is formed integrally with the spring member. According to the configuration, since the engaging portion is made of a resin, the outer shell of the card is not shaved off by the engaging portion even when the engaging portion repeatedly rubs against the resin face of the outer shell of the card.

When the sheet metal plate spring is simply replaced with a spring member molded of a resin, however, it is difficult to provide the spring member with a displacement amount sufficient for absorbing dispersions in the size and width of a card, and those of the production accuracy of the card connector itself, and also with a card holding force in a half-locked state. Specifically, a resin itself forming the spring member is poorer in elasticity than the sheet metal made plate spring, and the spring member molded of a resin has a tendency that loads are hardly dispersed during elastic deformation and stresses are concentrated only to one place of a basal end portion of the spring member. Consequently, there arises a situation where repetitive deformations due to insertion and extraction of a card causes the spring member to be plastically deformed in an early stage. As a result, it is difficult to maintain the half-lock performance for a long term.

In order to prevent the card in a card-set state from being forcedly extracted, it is advantageous to hold the card by a large force. When a half-locking force, i.e., the spring force of the plate spring in which the engaging portion is formed in the tip end is simply increased, the friction between the engaging portion of the sheet metal made plate spring and the resin face of the outer shell of the card is further increased. Consequently, the half-lock performance is drastically lowered. Moreover, the insertion and extraction resistance of the card in the state where the slider is at the stand-by position is large. Therefore, it is difficult to insert and extract the card, and, when the card is inserted, the slider is moved, whereby the insertion feeling is impaired.

The invention has been conducted in view of the above-discussed circumstances. It is an object of the invention to provide a card connector which is based on the concept that, among elements of a half-lock mechanism, a component(s) which is to rub against a card is molded of a resin, and a component(s) which is requested to exert an elastic function is made of a metal, and in which the initial half-lock performance can be maintained for a long term.

It is another object of the invention to provide a card connector into which a half-lock mechanism can be incorporated with using a small space that can be ensured in a slider.

It is a further object of the invention to provide a card connector into which a half-lock mechanism can be incorporated with using a small space that can be ensured in a slider, and in which the durability of a component(s) that is molded of a resin is enhanced.

It is a still further object of the invention to provide a card connector into which a half-lock mechanism can be incorporated with using a small space that can be ensured in a slider, and in which a component(s) that is made of a metal can exert a stable elastic function.

It is a still further object of the invention to provide a card connector which can improve a half-locking force in a card-set state while attaining the above-mentioned objects.

SUMMARY OF THE INVENTION

In the card connector of the invention, a slider which is to be pushed by a card that is inserted into a card insertion space of a case, to be moved from a stand-by position to a pushed position corresponding to a card-set position is attached to the case in a longitudinally movable manner, the slider at the pushed position being elastically urged in a card ejecting direction, the card connector has functions of locking the slider to the pushed position, and canceling the locked state of the slider which is locked at the pushed position, and the slider comprises a half-lock mechanism which engagingly holds the card in an extractable manner. Components of the half-lock mechanism are formed with being divided into: a movable piece which is configured by a flexurally deformable resin-molded member, and which integrally comprises an engaging projection that is to ride over the card inserted into the card insertion space to be fitted into a recess of the card, thereby engagingly holding the card in an extractable manner; and a metal-made spring member which elastically urges the movable piece in a direction along which the engaging projection is to be fitted into the recess of the card.

According to the configuration, the movable piece integrally comprising the engaging projection which is to rub against the card is a resin-molded member. Even when the outer shell of the card against which the engaging projection is to rub is made of a resin, therefore, there does not arise a situation where the outer shell of the card is shaved off by the engaging projection. Consequently, reduction of the card holding force due to shaving of the outer shell of the card hardly occurs, and hence the initial half-lock performance can be maintained for a long term. In addition, since the engaging projection is formed by a resin, there is an advantage that shapes of portions relating to the magnitude of a force in insertion and extraction of the card, such as the thickness of the engaging projection, the inclination angle of a guiding face for riding on the card, the width of engagement and the butting angle with the card in a half-locked state can be changed more easily than the case where such an engaging projection is formed by bending the tip end portion of a plate spring made of a sheet metal. Since the spring member which urges the movable piece is made of a metal, the spring member can be easily provided with a displacement amount sufficient for absorbing dispersions in the size and width of a card, and those of the production accuracy of the card connector itself, and also with a card holding force of a sufficient magnitude which is requested in a half-locked state. Furthermore, a situation where the spring member is plastically deformed in an early stage and the half-lock performance is early impaired does not occur.

In the invention, preferably, the movable piece elongates in a cantilevered manner from the slider in a direction along which the card is to be inserted into the card insertion space, the engaging projection that is to ride on a side end face of the card to be fitted into the recess formed in a side end portion of the card is disposed at a tip end portion of the movable piece, and the spring member is accommodated and held in a recess formed in the slider and behind the movable piece. According to the configuration, the half-lock mechanism can be incorporated with using a small space that can be ensured in the slider. Therefore, it is possible to provide a card connector in which the initial half-lock performance can be maintained for a long term without increasing the size of the card connector.

In the invention, preferably, the spring member has a spring main portion which elongates along a back face of the movable piece that elongates in a cantilevered manner from the slider, the spring main portion being placed overlappingly with the back face, and the movable piece comprises a load dispersing portion in a place including a continuous place where the movable piece is continuous to the slider, a thickness of the load dispersing portion being changed in a manner that the thickness is smaller as further separating from the continuous place. Preferably, in the movable piece, a place which elongates from the place continuous to the slider to an intermediate point in the elongating direction is formed as the load dispersing portion, and a portion which elongates from an end of the load dispersing portion to a free end has a uniform thickness.

According to the configuration, when the engaging portion rides on the card and the resin-made movable piece is flexurally deformed, the flexurally deformation does not depend on only bending deformation of a narrow region of a root portion of the movable piece (the place where the movable piece is continuous to the slider), and the movable piece is gradually slightly bent over a wide range including the load dispersing portion and a portion which is on the side of the tip end with respect thereto. Moreover, stresses which are applied to the movable piece when such flexural deformation of the movable piece occurs are allowed to escape to the spring member which is placed overlappingly with the back face of the movable piece, and then received by the spring main portion. Therefore, there hardly occurs a situation where stresses are concentrated to the root portion of the movable piece and the root portion is plastically deformed in an early stage. As a result, the durability of the movable piece configured by a resin-molded member is improved, and the initial half-lock performance can be maintained for a long term.

In the invention, preferably, the spring member is configured by a plate spring in which the spring main portion is continuous via an arcuate folded portion to an attachment piece portion attached to the recess of the slider, in a manner that the spring main portion is opposed to the attachment piece portion. When the spring member is formed as described above, the length of the spring main portion can be ensured to be long in comparison to the area (or the capacity) of the recess of the slider in which the spring member is disposed. Namely, the flexural deformation enabled range of the spring member is a range which is obtained by adding the spring main portion and the arcuate folded portion together. As compared with the sheet metal made plate spring which has been described in the beginning of the description, and which is attached to the slider in a cantilevered manner, therefore, the flexural deformation enabled range is longer by the length corresponding to the arcuate folded portion. Consequently, a larger flexural deformation width (displacement width) can be assumed for the same load. This is helpful in suppressing dispersions in the card holding force in a half-locked state due to those in the size of cards and the like, to a low level. Moreover, stresses are dispersed in the arcuate folded portion. Consequently, a situation where stresses are locally concentrated or repetitive stresses are applied to a local area to reduce the durability does not occur, and the load bearing characteristics are enhanced. As a result, the half-lock performance can be stabilized for a long term.

The card connector of the invention can be preferably used with setting a card as a use object, a surface of a side end portion of the card against which the engaging projection is to rub being formed at least as a synthetic resin face.

The card connector of the invention further comprises an auxiliary spring member which, when the slider is at the pushed position, increases an elastic force of the spring member.

According to the configuration, only when the slider is at the pushed position, the elastic force of the spring member, i.e., the half-locking force can be increased by the auxiliary spring member. When the slider is at the stand-by position, the auxiliary spring member does not act on the spring member. Therefore, the half-lock performance can be maintained for a long term, and excellent feeling can be obtained during a process of inserting a card.

In the invention, preferably, the auxiliary spring member is configured by a plate spring which is formed by stamping and raising a side wall portion of the case to cause a free end portion to face to a side of a back face of the spring member when the slider is at the pushed position.

According to the configuration, the auxiliary spring member is not formed as an additional component, and hence does not cause to impede the reduction of the production cost, and the reduction of the size. In the case where, in the side wall portion of the case, a side plate of a cover made of a sheet metal overlaps with the outer face of a body side wall made of a resin, the auxiliary spring member is configured by a plate spring which is formed by stamping and raising the cover side plate on the outside, whereby a necessary elastic force can be easily obtained. At the same time, the auxiliary spring member closes an opening which is formed in the body side wall correspondingly with the above configuration, and hence exerts the dust proofing function.

In the invention, preferably, a butting portion is formed to protrude from the free end portion of the spring member toward a side of a back face, and, when the slider is at the pushed position and the spring member is flexurally deformed together with the movable piece in a direction along which the engaging projection is to be disengaged from the recess, the free end portion of the auxiliary spring member is elastically contacted with the butting portion before the engaging projection is disengaged from the recess.

According to the configuration, only when a forced extracting operation is applied on the card in the card-set state in which the slider is at the pushed position, the elastic force of the auxiliary spring member can effectively urge the free end portion of the spring member.

As described above, the concept that, among elements of a half-lock mechanism, a component(s) which is to rub against a card is molded of a resin, and a component(s) which is requested to exert an elastic function is made of a metal is employed in the card connector of the invention.

Therefore, it is possible to provide a card connector in which a situation where the card connector is shaved off by repeatedly inserting into and extracting a card from the card insertion space and the initial half-lock performance is impaired at an early stage does not occur, and an excellent half-lock performance can be exerted for a long term. Moreover, it is possible to provide also a card connector in which the durabilities of the movable piece that is a resin element, and the spring member that is a metal element are improved, and an excellent half-lock performance can be exerted for a long term. Furthermore, the half-lock mechanism can be incorporated with using a small space that can be ensured in the slider. Therefore, the invention attains also an effect that the invention can be preferably applied to a card connector which is requested to be miniaturized and thinned.

The card connector of the invention comprises, in addition to the spring member which always urges the movable piece with the elastic force, the auxiliary spring member which, when the slider is at the pushed position, increases the elastic force of the spring member. When a forced extracting operation is applied on the card in the card-set state, therefore, the card can be held by a large force, and the card in the card-set state can be blocked from being forcedly extracted. By contrast, during a process of inserting or extracting a card when the slider is at the stand-by position, the card can be inserted or extracted at an adequate half-locking force. Moreover, this configuration is effective for maintaining the life of the half-locking force. As a result, the invention attains an effect that it is possible to provide a card connector in which a half-locking force in a card-set state can be improved without impairing the above-mentioned effects.

DETAILED DESCRIPTION OF THE PREFERRED EMBODIMENT

Figure 1:
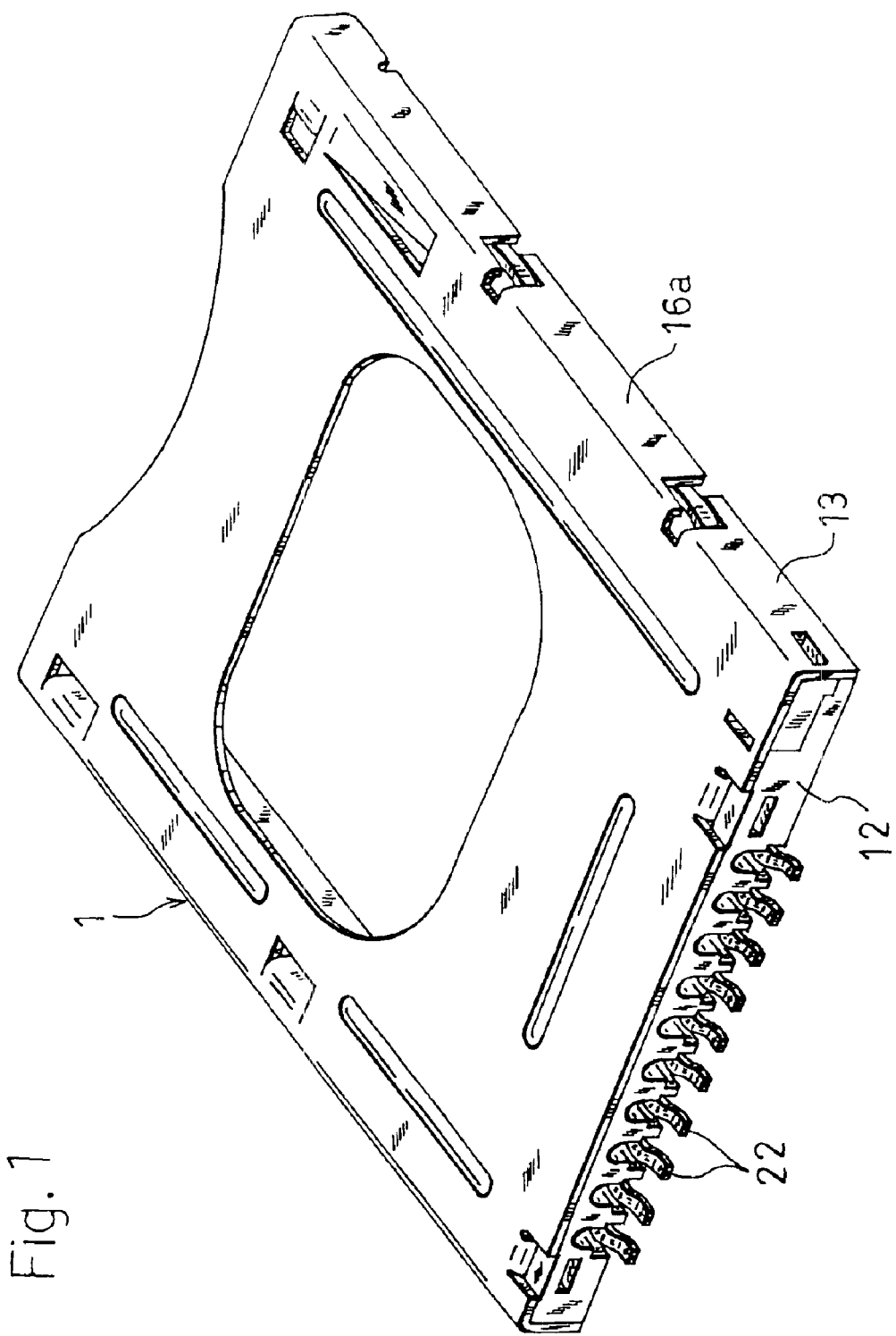
FIG. 1 is a schematic external view of the whole of the card connector of the invention.

FIG. 1 is a schematic external view of the whole of the card connector of the invention. In the card connector, a case 1 is formed by: a body 12 formed by a molded article of a synthetic resin; and a cover 13 which is made of a sheet metal, and which is attached to the body 12. A card insertion space (slot) is defined by the case 1, and a slider (described later) is placed in a side portion of the card insertion space inside the case 1.

Figure 2:
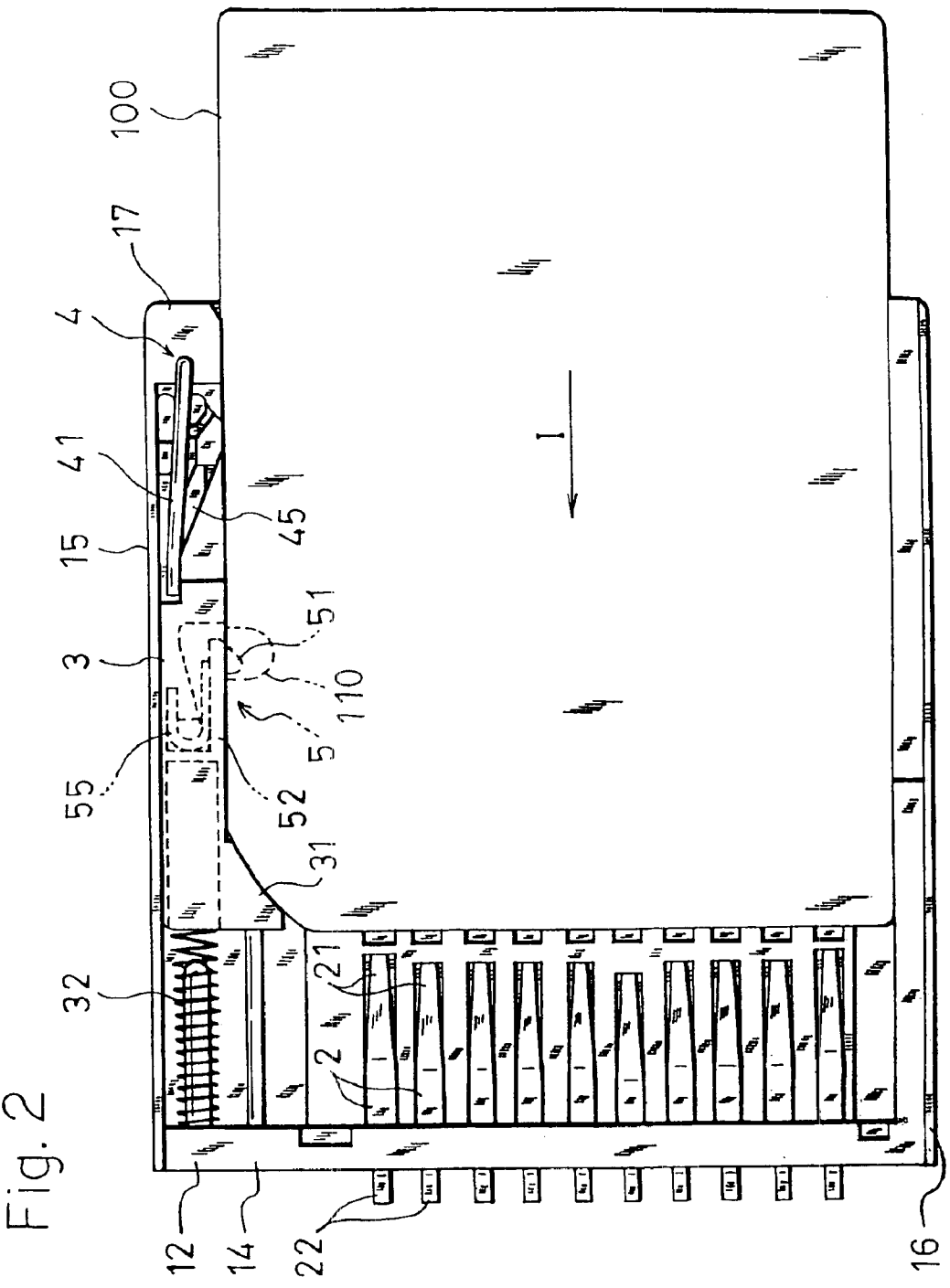
FIG. 2 is a plan view of a body in an initial state where a card is inserted into a card insertion space.
Figure 3:
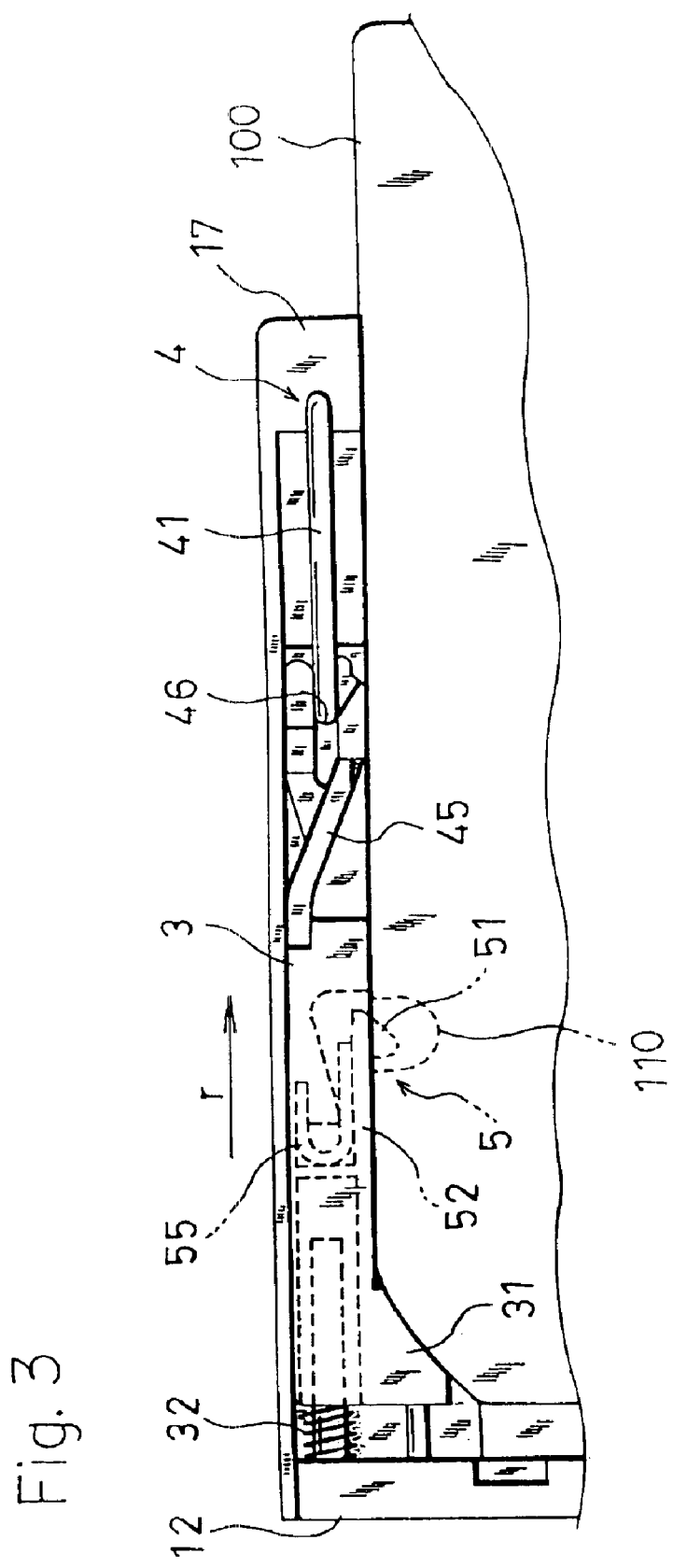
FIG. 3 is a plan view of main portions of the body in a state where a slider is locked.
Figure 4:
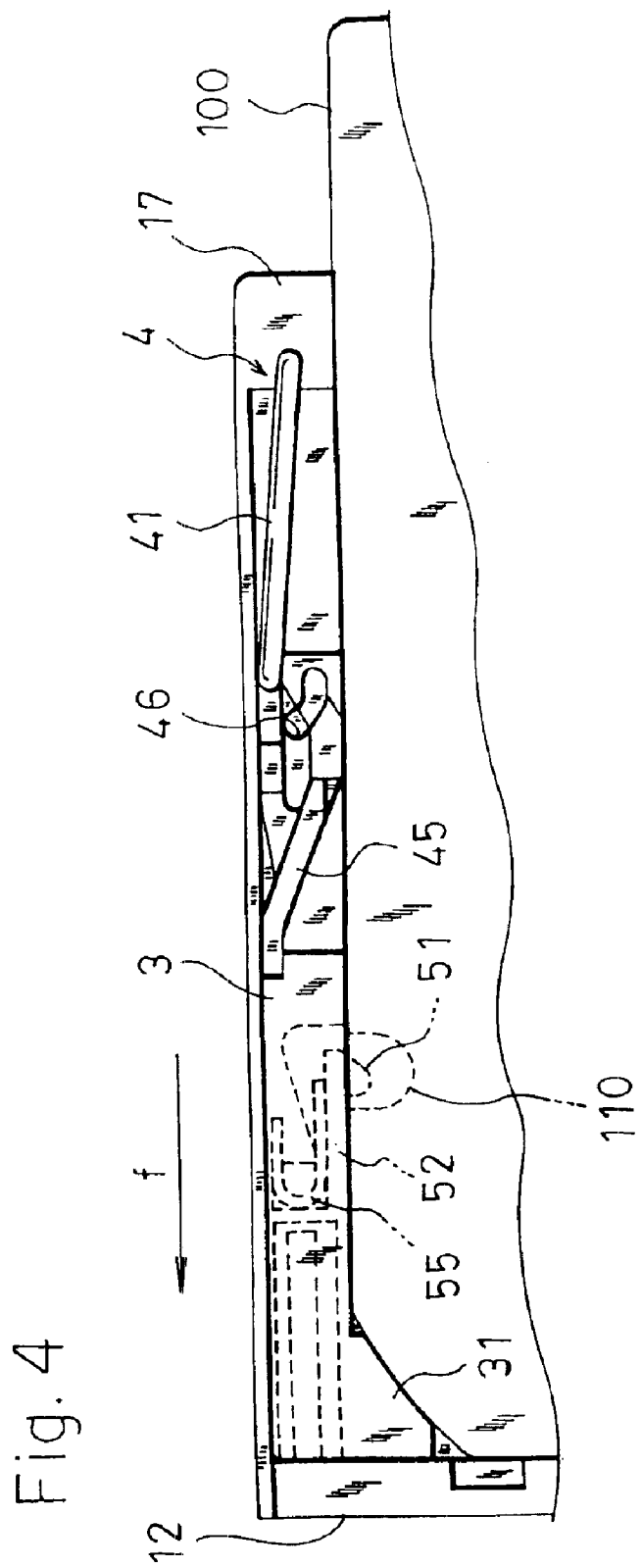
FIG. 4 is a plan view of main portions of the body at a timing when the lock is canceled.

FIG. 2 is a plan view of the body 12 in an initial state where a card 100 is inserted into the card insertion space, FIG. 3 is a plan view of main portions of the body 12 in a state where a slider 3 is locked, and FIG. 4 is a plan view of main portions of the body 12 at a timing when the lock is canceled.

As shown in FIG. 2, in the body 12, a large number of contact pieces 2 which are laterally arranged are attached to a head portion 14 in the front end of the body. Tip end portions of the contact pieces 2 which protrude into the body 12 are formed as contacts 21 corresponding to terminals formed in the card 100 that will be described later. By contrast, the other end portions of the contact pieces 2 which protrude outside the body 12 are formed as soldering terminals 22 which are to be soldered to lands of a circuit board (not shown), respectively. The body 12 has side walls 15, 16 in right and left edge portions. The space between the side walls 15, 16 is partitioned into the card insertion space into which the card 100 is to be inserted, and a slider accommodating space which is on one side of the card insertion space. The large number of contact pieces 2 protrude into a front end portion of the card insertion space.

The slider 3 which is longitudinally elongated is attached into the slider accommodating space of the body 12 in a longitudinally movable manner. The slider 3 comprises a card receiving portion 31 which inward protrudes from a front end portion. As shown in FIG. 2, the card receiving portion 31 receives a front corner of the card 100 which is inserted into the card insertion space. The slider 3 is always elastically urged toward the rear side by a spring member 32 configured by a coil spring. When the slider 3 butts against a projection 17 formed in the rear end of the body 12, the retraction limit position is restricted. The position of the slider 3 when the slider butts against the projection 17 to be positionally restricted is a stand-by position of the slider 3 (the position shown in FIG. 2).

The slider 3 comprises a cam mechanism 4. The cam mechanism 4 comprises a cam pin 41 in which a basal end portion is swingably held by the projection 17 of the body 12, and a cam groove 45 which is a counter element for the cam pin 41, and which is formed in the slider 3. The cam groove 45 has forward and return paths which are formed into an endless shape or a thin heart shape, and comprises an engaging portion 46 which is formed at a connecting portion between the forward and return paths by a depression for engaging with the cam pin 41. When a first pushing operation in which the slider 3 is pushed by the card 100 to be forward moved from the stand-by position is conducted, the cam pin 41 is passed through the forward path of the cam groove 45, and then the slider 3 is slightly retracted by the urging of the spring member 32 as indicated by the arrow r in FIG. 4, so that the engaging portion 46 is engaged with by the cam pin 41 as shown in the figure. This, state is a locked state of the slider. In the locked state, the terminals of the card 100 are elastically contacted with the contacts 21 of the contact pieces 2 to make electrical connections therebetween, respectively. When a second pushing operation is conducted in the locked state of the slider 3, the front end of the card 100 which is moved in the direction of the arrow f of FIG. 3 in the initial period of the pushing operation butts against the head portion 14 of the body 12 as shown in the figure, and the cam pin 41 separates from the engaging portion 46 of the cam groove 45, thereby canceling the locked state. Thereafter, the cam pin 41 is passed through the return path of the cam groove 45 to return to the beginning of the forward path, and the slider 3 is returned by the urging of the spring member 32 to the stand-by position. In the card connector, therefore, a card is inserted and ejected by a so-called push-push operation.

The slider 3 comprises a half-lock mechanism 5. The half-lock mechanism 5 exerts a function of engagingly hold the card 100 to the slider 3 in an extractable manner. Specifically, when the card is inserted into the card insertion space and the front corner of the card butts against the card receiving portion 31 of the slider 3, the card 100 is engagingly held to the slider 3 by the half-lock mechanism 5. The force of engagingly holding the card by the half-lock mechanism 5 is set to a magnitude at which, when the card 100 is pulled in the extracting direction by a force that is equal to or larger than a constant value, the engagingly held state is canceled to allow the card 100 to be extracted.

Figure 5:
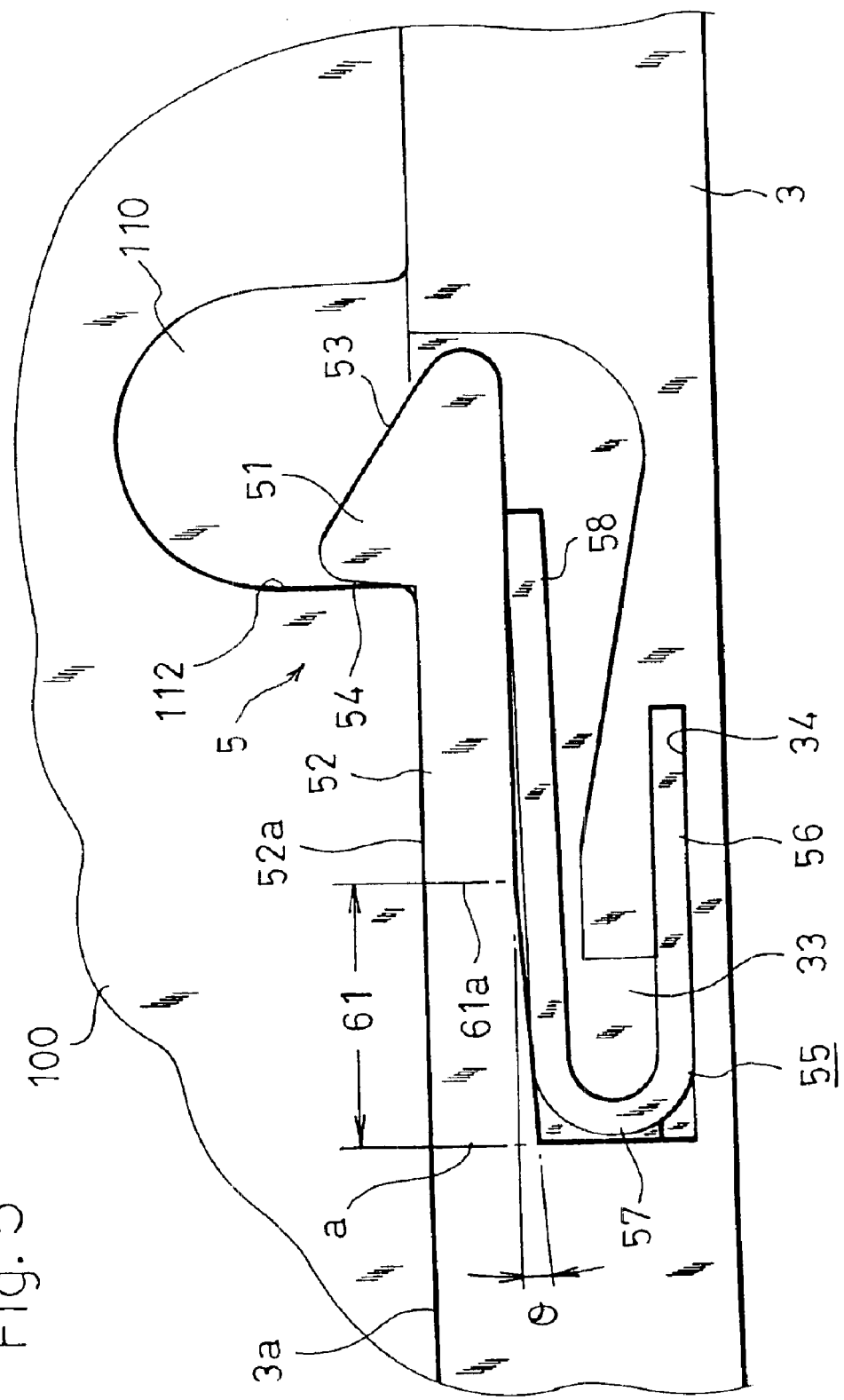
FIG. 5 is an enlarged plan view of a half-lock mechanism in a half-locked state.
Figure 6:
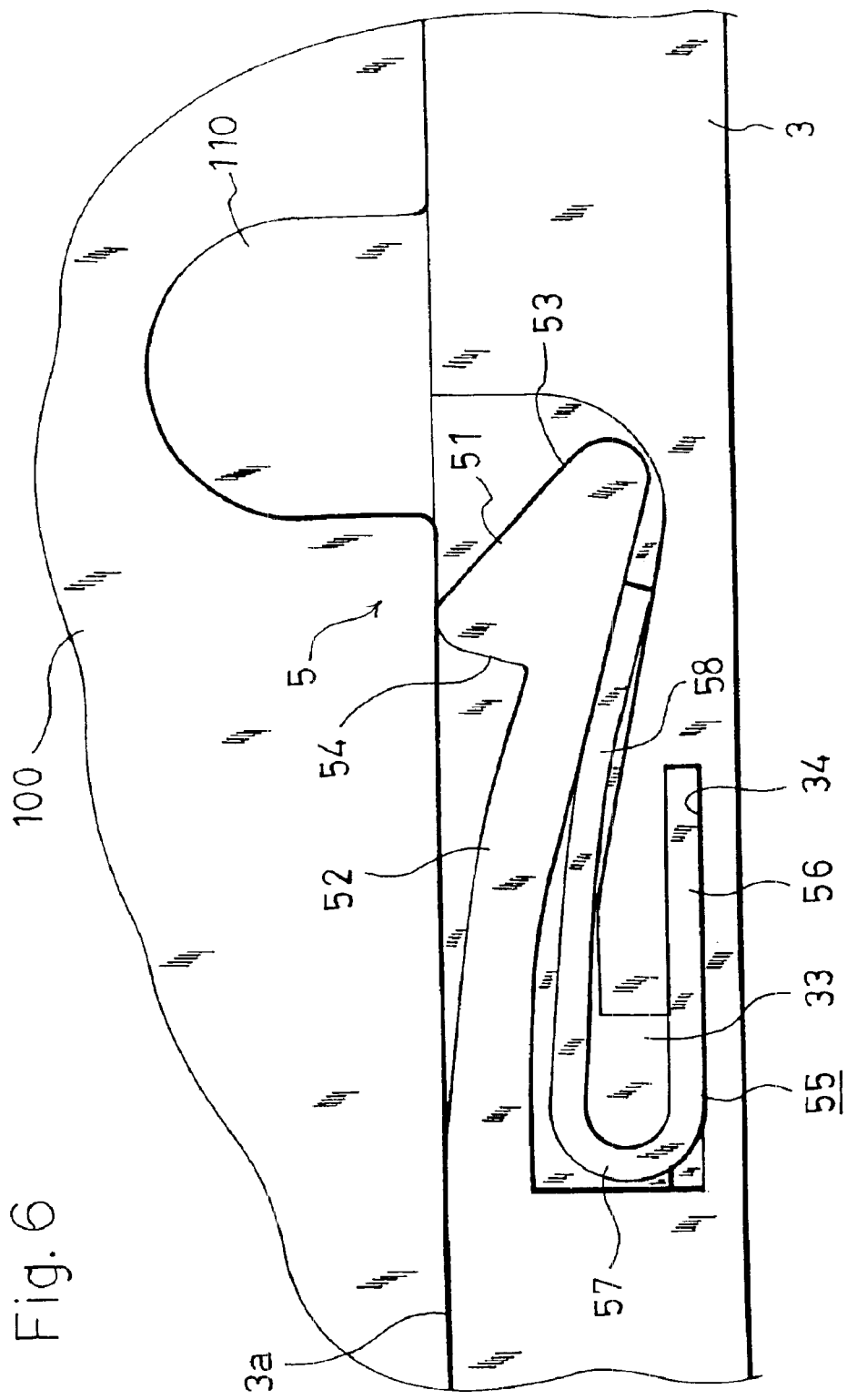
FIG. 6 is an enlarged plan view of the half-lock mechanism in a half-lock canceled state.

FIG. 5 is an enlarged plan view of the half-lock mechanism 5 in the state where the card 100 is half-locked, and FIG. 6 is an enlarged plan view of the half-lock mechanism 5 in the state where the card 100 is not half-locked. The half-lock mechanism 5 will be described in detail with reference to FIGS. 5 and 6. As seen from FIGS. 2 to 4, the half-lock mechanism 5 is disposed on the face of the slider 3 opposite to the cam formed face.

The half-lock mechanism 5 is formed by two split elements, i.e., an element configured by a resin molded article which is integrated with the slider 3, and that made of a metal. Among the elements, the element configured by a resin molded article corresponds to a movable piece 52 which integrally comprises an engaging projection 51, and the element made of a metal corresponds to a sheet metal made spring member 55 configured by a plate spring.

The movable piece 52 rearward elongates from the slider 3 in a cantilevered manner in the insertion direction (the direction of the arrow I in FIG. 2) of the card 100 into the card insertion space. The engaging projection 51 which protrudes into the card insertion space is integrated with a tip end portion of the movable piece 52. The engaging projection 51 comprises: an inclined guiding face 53 which, when the card 100 is inserted, enables the engaging projection 51 to ride on a side end portion of the card 100; and an engaging face 54 which, when the engaging projection 51 is fitted into a recess 110 formed in the side end portion of the card 100, can be engaged with a front wall face 112 of the recess 110. By contrast, the spring member 55 is accommodated and held into a recess 33 formed in the slider 3 behind the movable piece 52. Namely, the spring member 55 has: a narrow folded portion 57 which is arcuately bent and elongates from the front edge of a wide attachment piece portion 56 that is fitted into an attachment groove 34 formed in the recess 33, to be secured to the slider 3; and a plate-like spring main portion 58 in which the width is equal to that of the folded portion 57, and which is continuous to the folded portion 57. The spring main portion 58 elongates along the back face of the movable piece 52 to overlap with the movable piece 52. In this state, the spring main portion is opposed to the attachment piece portion 56. According to the configuration, the half-lock mechanism can be incorporated with using the recess 33 which is a small space that can be ensured in the slider 3, and hence it is possible to provide a card connector in which the initial half-lock performance can be maintained for a long term without increasing the size of the card connector. In the embodiment, when the card 100 is not inserted, the front face 52a of the movable piece 52 in the no-load state is flush with the inner face 3a of the slider 3. The spring main portion 58 which overlaps with the movable piece 52 may be in either of a state where the spring main portion 58 is elastically contacted with the movable piece 52 in the no-load state, or that where the spring main portion 58 is simply contacted with the movable piece 52 and does not urge the movable piece 52. In any one of the states, when the card 100 is not inserted, the front face 52a of the movable piece 52 is preferably flush with the inner face 3a of the slider 3. According to the configuration, the card 100 can be smoothly inserted into the card insertion space without colliding with the movable piece 52 and the engaging projection 51, and the projection width of the engaging projection 51 from the movable piece 52 can be suppressed to a small degree.

In the card connector described above, in the case where the card 100 is inserted into the card insertion space, during a period until the card 100 butts against the card receiving portion 31 of the slider 3, the engaging projection 51 rides on the side end portion of the card 100 while causing the movable piece 52 to be outward flexurally deformed, and, as shown in FIG. 2 or 5, the movable piece 52 is then returned to the original position so that the engaging projection 51 is fitted into the recess 110 of the card 100. In this case, when the engaging projection 51 rides on the side end portion of the card 100 while causing the movable piece 52 to be outward flexurally deformed, the spring main portion 58 and the folded portion 57 of the spring member 55 are elastically deformed to absorb the displacement of the movable piece 52, and, when the engaging projection 51 rides over the side end portion of the card 100 to reach the recess 110, the movable piece 52 is returned to the original position by returning deformation of the spring member 55, whereby the engaging projection 51 is fitted into the recess 110. When the engaging projection 51 is fitted into the recess 110 of the card 100 in this way, the engaging face 54 of the engaging projection 51 is opposed to the front wall face 112 of the recess 110. When the card 100 is pulled in the extracting direction, therefore, the engaging face 54 is engagingly held by the front wall face 112 of the recess 110. In the case where the extracting force is not so large, even when the engaging face 54 is rearward pushed by the front wall face 112 of the recess 110, the movable piece 52 is not flexurally deformed against the urging of the spring member 55. This is a half-lock function. In the case where the extracting force is equal to or larger than the constant value, when the engaging face 54 is rearward pushed by the front wall face 122 of the recess 110, however, the movable piece 52 is flexurally deformed toward the outside against the urging of the spring member 55, and hence the engaging projection 51 is pushed out of the recess 110, so that the card 100 is extracted. Since the spring member 55 comprises the arcuate folded portion 57 and the thin spring main portion 58 which is continuous to the folded portion 57, the length of the total of the spring main portion 58 and the arcuate folded portion 57 which is the flexural deformation enabled range of the spring member 55 can be ensured to be long in comparison to the area (or the capacity) of the recess 33 of the slider 3 in which the spring member 55 is disposed. The spring main portion 58 can be ensured to have a large flexural deformation width. This is helpful in suppressing dispersions in the card holding force in the half-locked state due to those in the size of cards and the like, to a low level. Moreover, stresses are dispersed in the arcuate folded portion 57. Consequently, a situation where stresses are locally concentrated or repetitive stresses are applied to a local area to reduce the durability does not occur, and the load bearing characteristics are enhanced. As a result, the half-lock performance can be stabilized for a long term.

In the card connector, the engaging projection 51 which is to rub against the card 100 is resin-molded integrally with the movable piece 52 configured by a resin-molded member. Even when the outer shell of the card 100 against which the engaging projection 51 is to rub is made of a resin, therefore, there does not arise a situation where the outer shell of the card 100 is shaved off by the engaging projection 51. Consequently, reduction of the card holding force of the half-lock mechanism 5 due to shaving of the outer shell of the card 100 hardly occurs, and hence the initial half-lock performance can be maintained for a long term. In addition, when the engaging projection 51 is resin-molded, shapes of portions relating to the magnitude of the force in insertion and extraction of the card, such as the thickness of the engaging projection 51, the inclination angle of the guiding face 53 for riding on the card 100, the width of engagement and the butting angle with the card 100 in the half-locked state can be easily changed. On the other hand, since the spring member 55 which urges the movable piece 52 is produced by a metal-made plate spring, the spring member can be easily provided with a displacement amount sufficient for absorbing dispersions in the size and width of the card 100, and those of the production accuracy of the card connector itself, and also with a card holding force of a sufficient magnitude which is requested in a half-locked state. Furthermore, a situation where the spring member is plastically deformed in an early stage and the half-lock performance is early impaired does not occur.

As shown in FIG. 5, the movable piece 52 used in the embodiment comprises a load dispersing portion 61 in a place including a continuous place a where the movable piece is continuous to the slider 3. The thickness of the load dispersing portion is changed in a manner that the thickness is smaller as further separating from the continuous place a. The place which elongates from the place a continuous to the slider 3 to an intermediate point in the elongating direction corresponds to the load dispersing portion 61. In the portion which elongates from the end 61a of the load dispersing portion 61 to the free end, the movable piece 52 has a uniform thickness. In the embodiment, in order to provide the movable piece 52 with the load dispersing portion 61, an inclination θ is formed in the outer face of the movable piece 52 in the outside.

When the root portion of the movable piece 52 configured by a resin molded article is formed as the load dispersing portion 61, its thickness can be made thinner as further moving toward the free end. According to the configuration, when the engaging portion 51 rides on the card 100 and the resin-made movable piece 52 is flexurally deformed as shown in FIG. 6, the flexurally deformation does not depend on only bending deformation of the narrow region of the root portion of the movable piece 52, and the movable piece 52 is gradually slightly bent over a wide range including the load dispersing portion 61 and a portion which is on the side of the tip end with respect thereto. Moreover, stresses which are applied to the movable piece 52 when such flexural deformation of the movable piece 52 occurs are allowed to escape to the spring member 55 which is placed overlappingly with the back face of the movable piece 52, and then received by the spring main portion 58. Therefore, there hardly occurs a situation where stresses are concentrated to the root portion of the movable piece 52 and the root portion is plastically deformed in an early stage. As a result, the durability of the movable piece 52 configured by a resin-molded member is improved, and the initial half-lock performance can be maintained for a long-term.

Figure 7:
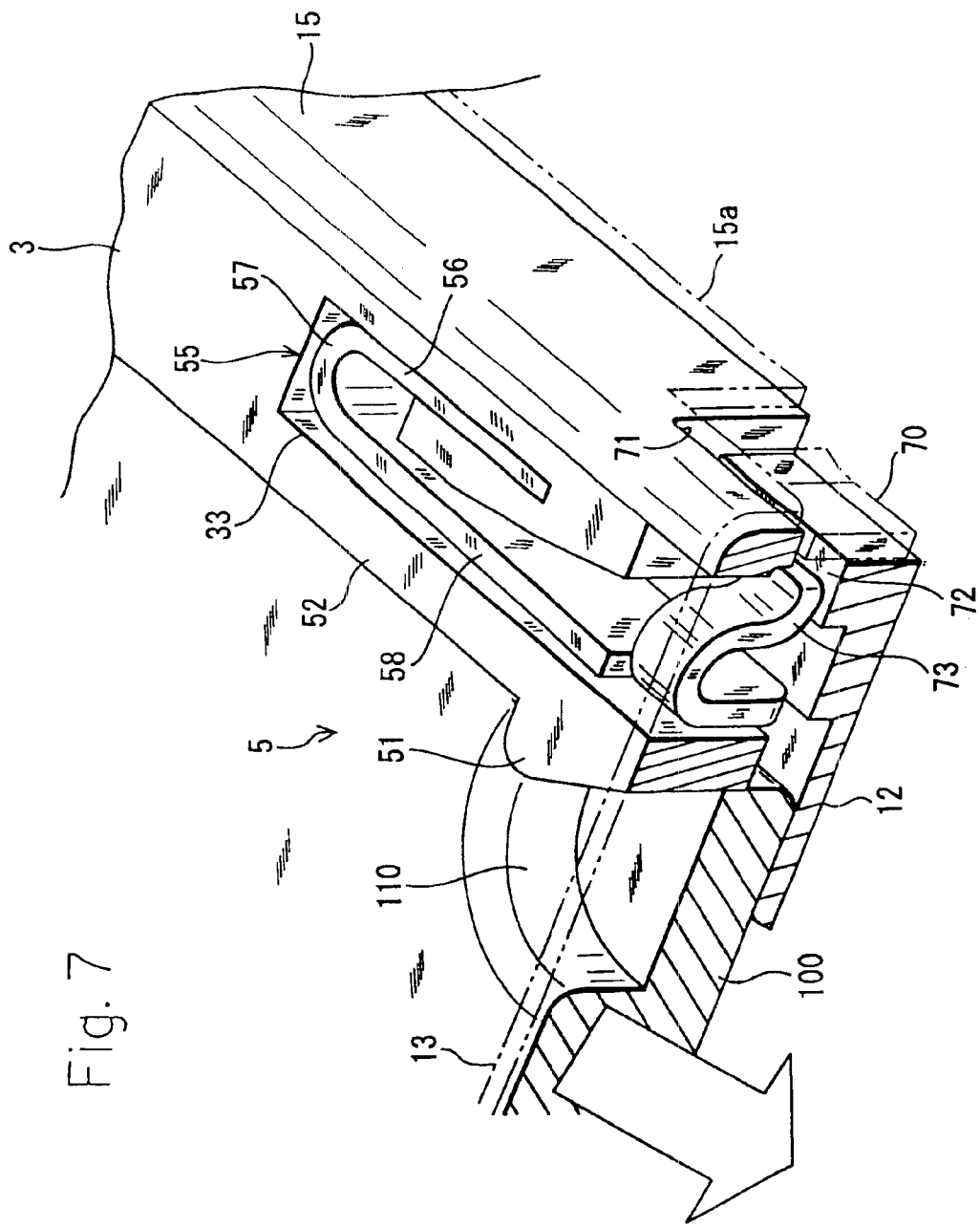
FIG. 7 is an enlarged perspective view of the half-lock mechanism showing a structure which increases a half-locking force in the half-lock mechanism shown in FIGS. 1 to 6, in a card-set state.
Figure 8:
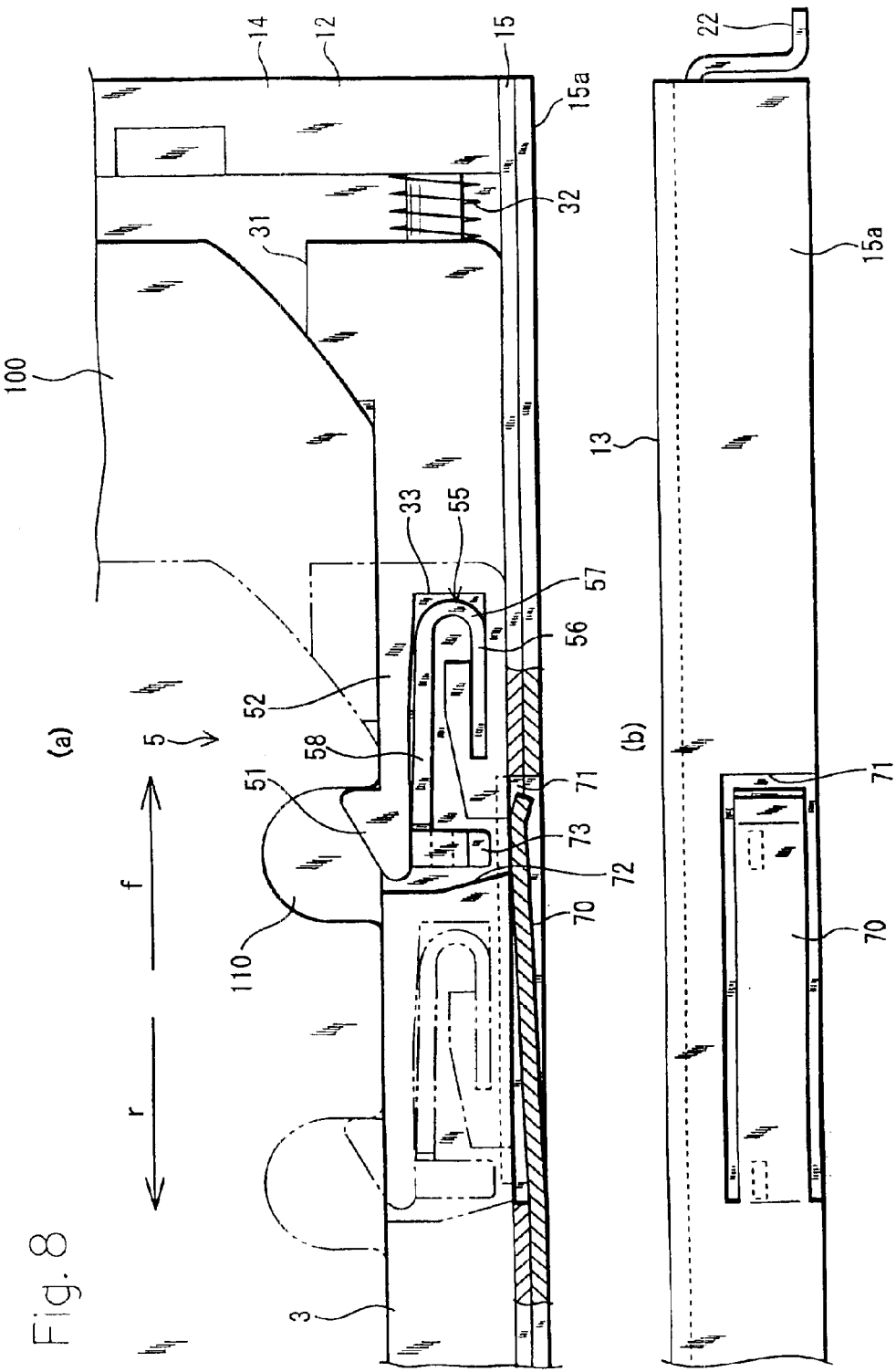
FIG. 8A is a plan view of the half-lock mechanism showing the structure of FIG. 7.
FIG. 8B is a side view of the mechanism.
Figure 9:
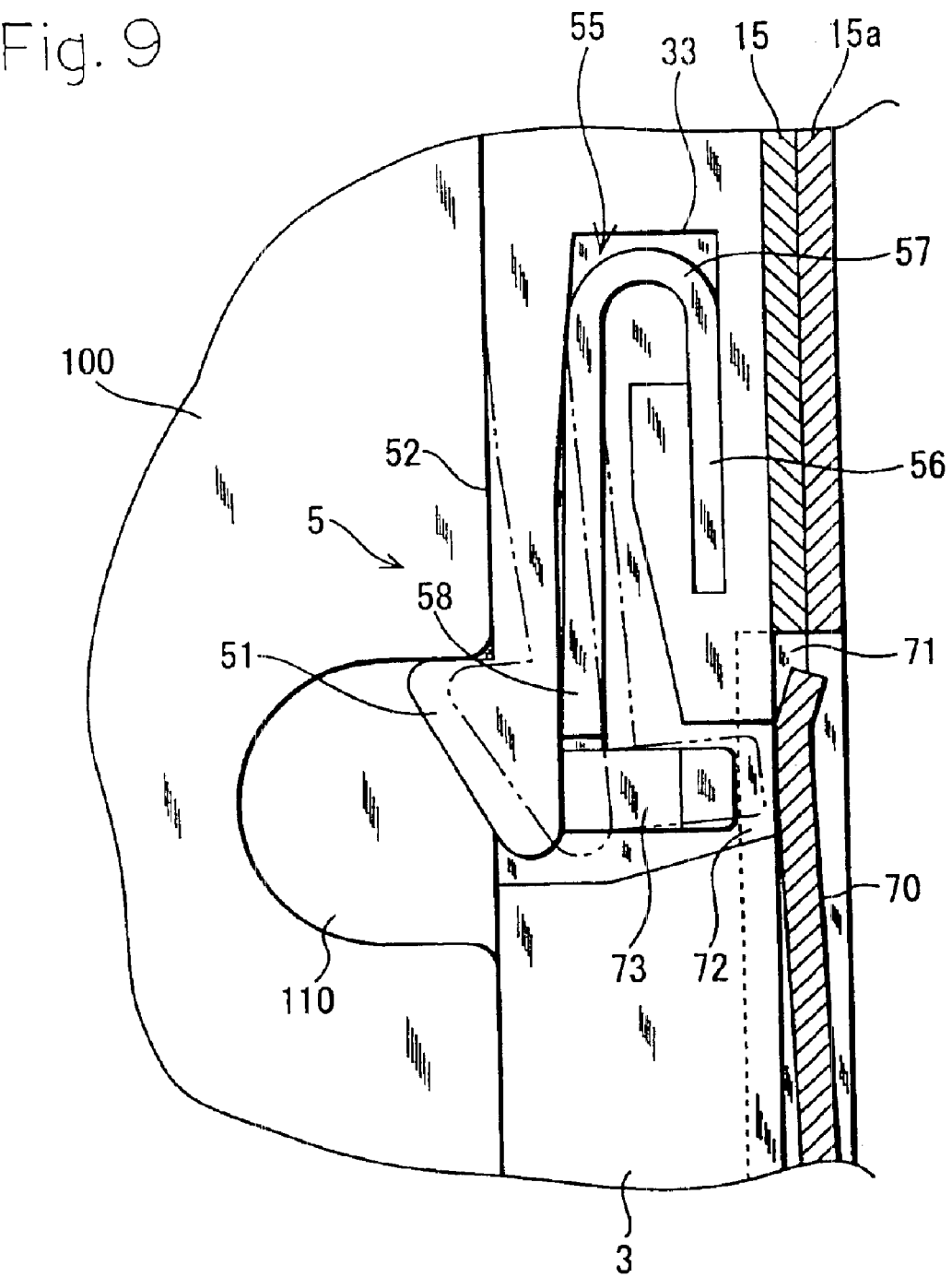
FIG. 9 is an enlarged plan view of the half-lock mechanism showing the structure of FIG. 7.

FIGS. 7 to 9 show a structure which increases the half-locking force in the half-lock mechanism 5 shown in FIGS. 1 to 6 when the slider 3 is at the pushed position, i.e., in the card-set state. In the structure, an auxiliary spring member 70 which, when the slider 3 is at the pushed position, increases the elastic force of the spring member 55 is added to the half-lock mechanism 5 shown in FIGS. 1 to 6.

The auxiliary spring member 70 is configured by a plate spring which is formed by stamping and raising a side wall portion of the case 1 to cause the free end to face to the side of the back face of the spring member 55 when the slider 3 is at the pushed position. Specifically, a longitudinally elongated opening 71 is formed in one side wall portion 15 of the body 12 with which the outer side face of the slider 3 is in sliding contact. The opening 71 is continuously formed in a range from a back face portion of the engaging projection 51 when the slider 3 is at the stand-by position (the position indicated by the phantom lines in FIG. 8), to that of the engaging projection 51 when the slider 3 is at the pushed position (the position indicated by the solid lines in FIG. 8). Right and left edge portions of the sheet metal-made cover 13 have side plate portions 15a, 16a which are to overlap with the outer faces of the lateral side walls 15, 16 of the body 12, respectively, so that the side wall of the case 1 is formed into a double structure. In one side plate portion 15a of the cover 13 which is to overlap with the side wall 15 where the opening 71 is formed, the portion which covers the opening 71 is stamped and raised to be formed as a metal-made plate spring so that the auxiliary spring member 70 is configured in the range from the back face portion of the engaging projection 51 when the slider 3 is at the stand-by position, to that of the engaging projection 51 when the slider 3 is at the pushed position. The thus configured auxiliary spring member 70 elongates in a cantilevered manner from the back face portion of the engaging projection 51 when the slider 3 is at the stand-by position, to that of the engaging projection 51 when the slider 3 is at the pushed position, so as to substantially close the opening 71, and in an inclined shape where the auxiliary spring member enters the opening 71 more deeply as further moving from the basal end side to the free end. The auxiliary spring member is elastically displaceable in lateral directions. The free end portion of the auxiliary spring member faces to the side of the back face of the engaging projection 51 when the slider 3 is at the pushed position. The free end portion of the auxiliary spring member 70 is elastically supported by the outer side face of the slider 3 at an adequate elastic force (at the magnitude which does not impede smooth movement of the slider 3).

On the other hand, in the slider 3, a cutaway portion 72 is disposed so that the side of the back face of the free end portion of the spring member 55 in the recess 33 which accommodates and holds the spring member 55, i.e., the side of the back face of the end portion of the spring main portion 58 which overlaps with the side of the back face of the engaging projection 51 is exposed to the outside of the slider 3. When the slider 3 is at the pushed position, the free end portion of the auxiliary spring member 70 is opposed through the opening 71 to the side of the back face of the end portion of the spring main portion 58. A butting portion 73 is protrudingly formed on the side of the back face of the end portion of the spring main portion 58. The butting portion 73 is formed by bending a flat metal piece portion which is continuous integrally to the end portion of the spring main portion 58, so as to elongate on the side of the back face of the end portion of the spring main portion 58. Specifically, the flat metal piece portion may be bent perpendicular to the spring main portion 58 so that the butting portion 73 is formed into a flat plate-like shape. Preferably, as shown in FIG. 7, the flat metal piece portion is bent toward the side of the back face of the end portion of the spring main portion 58 into a U-like shape so that the butting portion 73 itself has a spring property. The butting portion 73 is formed so as to protrude from the free end portion of the spring main portion 58 toward the face of the back face, thereby, in the state where the spring main portion 58 is not flexurally deformed together with the movable piece 52, enabling a gap to be formed between the butting portion and the free end portion of the auxiliary spring member 70 when the slider is at the pushed position. The butting portion 73 is configured so that, when the spring main portion 58 is flexurally deformed together with the movable piece 52 in the direction along which the engaging projection 51 is to be disengaged from the recess 110, the free end portion of the auxiliary spring member 70 is elastically contacted with the butting portion 73 before the engaging projection 51 is disengaged from the recess 110.

Next, the function of the auxiliary spring member 70 will be described. When the slider 3 is at the stand-by position, as indicated by the phantom lines in FIG. 8, the side of the basal end of the auxiliary spring member 70 is opposed to the engaging projection 51 formed in the tip end portion of the movable piece 52, and also to the free end portion of the spring main portion 58 which overlaps with the back face of the movable piece. In the case where the card 100 is to be inserted or extracted when the slider 3 is at the stand-by position, therefore, the outward displacement amounts of the movable piece 52 and the spring main portion 58 caused by riding on the side end portion of the card 100 when the engaging projection 51 is to be engaged with or disengaged from the recess 110 of the card 100 are insufficient for the butting portion 73 to butt against the auxiliary spring member 70. When the slider 3 is at the stand-by position, consequently, the elastic force of the auxiliary spring member 70 is not applied to the spring member 55, and hence the elastic force of the spring member 55 or the half-locking force is not increased. By contrast, when the slider 3 is at the pushed position, as indicated by the solid lines in FIGS. 7 and 8 and shown in FIG. 9, the free end portion of the auxiliary spring member 70 is opposed to that of the spring main portion 58. In the case where there arises a situation where the card 100 is forcedly extracted in the state where the slider 3 is at the pushed position and the engaging projection 51 is engaged with the recess 110 of the card 100, i.e., in the card-set state, when, the movable piece 52 and the spring main portion 58 are flexurally deformed toward the outside so as to cause the engaging projection 51 to be disengaged from the recess 110 of the card 100, therefore, the end portion of the butting portion 73 is elastically contacted with the free end portion of the auxiliary spring member 70 before the engaging projection 51 is disengaged from the recess 110 of the card 100. Thereafter, the elastic force of the auxiliary spring member 70 is applied to the spring member 55, and the elastic force of the spring member 55, i.e., the half-locking force is increased as compared with that when the slider 3 is at the stand-by position, so that the card 100 can be held by a larger force. As a result, the card connector exerts a function of preventing the card 100 in the card-set state from being forcedly extracted.

As described above, the card connector comprises the auxiliary spring member 70 which, when the slider 3 is at the pushed position, increases the elastic force of the spring member 55. Only when the slider 3 is at the pushed position, therefore, the elastic force of the spring member 55, i.e., the half-locking force can be increased by the auxiliary spring member 70. When the slider 3 is at the stand-by position, the auxiliary spring member 70 does not act on the spring member 55. Therefore, the half-lock performance can be maintained for a long term, and excellent feeling can be obtained during a process of inserting a card.

The auxiliary spring member 70 is configured by a plate spring which is formed by stamping and raising the side wall portion 15 or 15a of the case 1 to cause the free end portion to face to the side of the back face of the spring member 55 when the slider 3 is at the pushed position. Therefore, the auxiliary spring member 70 is not formed as an additional component, and hence does not cause to impede the reduction of the production cost, and the reduction of the size. In the case where, in the side wall portion of the case 1, the side plates 15a, 16a of the cover 13 made of a sheet metal overlap with the outer faces of the side walls 15, 16 of the resin-made body 12, the auxiliary spring member 70 is configured by a plate spring which is formed by stamping and raising the cover side plate 15a on the outside, whereby a necessary elastic force can be easily obtained. At the same time, the auxiliary spring member 70 closes the opening which is formed in the body side wall 15 correspondingly with the above configuration, and hence exerts the dust proofing function.

Furthermore, the butting portion 73 is formed so as to protrude from the free end portion of the spring member 55 to the side of the back face, and, when the slider 3 is at the pushed position and the spring main portion 58 of the spring member 55 is flexurally deformed together with the movable piece 52 in the direction along which the engaging projection 51 is to be disengaged from the recess 110, the free end portion of the auxiliary spring member 70 is elastically contacted with the butting portion 73 before the engaging projection 51 is disengaged from the recess 110. According to the configuration, only when a forced extracting operation is applied on the card in the card-set state in which the slider 3 is at the pushed position, the elastic force of the auxiliary spring member 70 can effectively urge the free end portion of the spring main portion 58 of the spring member 55. Therefore, the half-locking force when the slider 3 is at the pushed position can be efficiently improved.

The card connector comprises the auxiliary spring member 70 which, when the slider 3 is at the pushed position, increases the elastic force of the spring member 55, in addition to the spring member 55 which always urges the movable piece 52 with the elastic force. When a forced extracting operation is applied in the card-set state, therefore, the card 100 can be held by a large force, and the card in the card-set state can be blocked from being forcedly extracted. By contrast, during a process of inserting or extracting a card when the slider 3 is at the stand-by position, the card 100 can be inserted or extracted at an adequate half-locking force. Moreover, this configuration is effective for maintaining the life of the half-locking force. As a result, the half-locking force in the card-set state can be improved while maintaining the half-lock performance for a long term.

In the case where the objective is only to improve the half-locking force in the card-set state, the spring member 55 may be eliminated, and it is necessary only to, when the slider 3 is moved to the pushed position, directly urge the engaging projection 51 with the elastic force of the auxiliary spring member 70. In this case, a butting portion having the same function as that of the butting portion 73 is formed on the engaging projection 51 so as to protrude toward the side of the back face. In such a case, a card connector is useful in which the slider 3 which is to be pushed by the card 100 that is inserted into the card insertion space of the case 1, to be moved from the stand-by position to the pushed position corresponding to the card-set position is attached to the case 1 in a longitudinally movable manner, the slider 3 at the pushed position being elastically urged in the card ejecting direction, the card connector has functions of locking the slider 3 to the pushed position, and canceling the locked state of the slider 3 which is locked at the pushed position, and the slider 3 comprises the half-lock mechanism 5 which engagingly holds the card 100 in an extractable manner. In the card connector, the following configurations are necessary: components of the half-lock mechanism 5 are formed with being divided into: the movable piece 52 which is configured by a flexurally deformable resin-molded member, and which integrally comprises the engaging projection 51 that is to ride over the card 100 inserted into the card insertion space to be fitted into the recess 110 of the card 100, thereby engagingly holding the card 100 in an extractable manner; and the metal-made spring member which elastically urges the movable piece 52 in the direction along which the engaging projection 51 is to be fitted into the recess 110 of the card 100; and, when the slider 3 is at the pushed position, the spring member elastically urges the engaging projection 51. In the card connector, the spring member corresponds to the auxiliary spring member 70 which has been described in the embodiment.

What is claimed is:

1. A card connector in which a slider which is to be pushed by a card that is inserted into a card insertion space of a case, to be moved from a stand-by position to a pushed position corresponding to a card-set position is attached to said case in a longitudinally movable manner, said slider at the pushed position being elastically urged in a card ejecting direction, said card connector has functions of locking said slider to the pushed position, and canceling the locked state of said slider which is locked at the pushed position, and said slider comprises a half-lock mechanism which engagingly holds said card in an extractable manner, wherein components of said half-lock mechanism are formed with being divided into: a movable piece which is configured by a flexurally deformable resin-molded member, and which integrally comprises an engaging projection that is to ride over said card inserted into the card insertion space to be fitted into a recess of said card, thereby engagingly holding said card in an extractable manner; and a metal-made spring member which elastically urges said movable piece in a direction along which said engaging projection is to be fitted into said recess of said card.

2. A card connector according to claim 1, wherein said movable piece elongates in a cantilevered manner from said slider in a direction along which said card is to be inserted into the card insertion space, said engaging projection that is to ride on a side end face of said card to be fitted into said recess formed in a side end portion of said card is disposed at a tip end portion of said movable piece, and said spring member is accommodated and held in a recess formed in said slider and behind said movable piece.

3. A card connector according to claim 2, wherein said spring member has a spring main portion which elongates along a back face of said movable piece that elongates in a cantilevered manner from said slider 3 said spring main portion being placed overlappingly with the back face, and said movable piece comprises a load dispersing portion in a place including a continuous place where said movable piece is continuous to said slider, a thickness of said load dispersing portion being changed in a manner that the thickness is smaller as further separating from said continuous place.

4. A card connector according to claim 3, wherein, in said movable piece, a place which elongates from said place continuous to said slider to an intermediate point in the elongating direction is formed as said load dispersing portion, and a portion which elongates from an end of said load dispersing portion to a free end has a uniform thickness.

5. A card connector according to claim 3, wherein said spring member is configured by a plate spring in which said spring main portion is continuous via an arcuate folded portion to an attachment piece portion attached to said recess of said slider, in a manner that said spring main portion is opposed to said attachment piece portion.

6. A card connector according to claim 4, wherein said spring member is configured by a plate spring in which said spring main portion is continuous via an arcuate folded portion to an attachment piece portion attached to said recess of said slider, in a manner that said spring main portion is opposed to said attachment piece portion.

7. A card connector according to any one of claims 1 to 6, wherein said card is set as a use object, a surface of a side end portion of said card against which said engaging projection is to rub being formed at least as a synthetic resin face.

8. A card connector in which a slider 3 which is pushed by a card that is inserted into a card insertion space of a case, to be moved from a stand-by position to a pushed position corresponding to a card-set position is attached to said case in a longitudinally movable manner, said slider at the pushed position being elastically urged in a card ejecting direction, said card connector has functions of locking said slider to the pushed position, and canceling the locked state of said slider which is locked at the pushed position, and said slider comprises a half-lock mechanism which engagingly holds said card in an extractable manner, wherein components of said half-lock mechanism are formed with being divided into: a movable piece which is configured by a flexurally deformable resin-molded member, and which integrally comprises an engaging projection that is to ride over said card inserted into the card insertion space to be fitted into a recess of said card, thereby engagingly holding said card in an extractable manner; and a metal-made spring member which elastically urges said movable piece in a direction along which said engaging projection is to be fitted into said recess of said card, and said card connector further comprises an auxiliary spring member which, when said slider is at the pushed position, increases an elastic force of said spring member.

9. A card connector according to claim 8, wherein said auxiliary spring member is configured by a plate spring which is formed by stamping and raising a side wall portion of said case to cause a free end portion to face to a side of a back face of said spring member when said slider is at the pushed position.

10. A card connector according to claim 8 or 9, wherein a butting portion is formed to protrude from said free end portion of said spring member toward a side of a back face, and, when said slider is at the pushed position and said spring member is flexurally deformed together with said movable piece in a direction along which said engaging projection is to be disengaged from said recess, said free end portion of said auxiliary spring member is elastically contacted with said butting portion before said engaging projection is disengaged from said recess.

* * * * *

UNITED STATES PATENT AND TRADEMARK OFFICE
CERTIFICATE OF CORRECTION

| | |
|---|---|
| PATENT NO. | : 6,899,555 B2 |
| APPLICATION NO. | : 10/780715 |
| DATED | : May 31, 2005 |
| INVENTOR(S) | : Nagata et al. |

Page 1 of 1

It is certified that error appears in the above-identified patent and that said Letters Patent is hereby corrected as shown below:

Column 14, line 28, the number "3" should be deleted

Column 14, line 36, the word "being" should be changed to --and--

Column 15, line 22, the number "3" should be deleted

Column 16, line 1, the word "being" should be changed to --and--

Signed and Sealed this

Nineteenth Day of June, 2007

JON W. DUDAS
*Director of the United States Patent and Trademark Office*

UNITED STATES PATENT AND TRADEMARK OFFICE
CERTIFICATE OF CORRECTION

PATENT NO.       : 6,899,555 B2                                        Page 1 of 1
APPLICATION NO. : 10/780715
DATED            : May 31, 2005
INVENTOR(S)      : Nagata et al.

It is certified that error appears in the above-identified patent and that said Letters Patent is hereby corrected as shown below:

Column 14, line 36, the word "being" should be changed to --and--

Column 14, line 28, the number "3" should be deleted

Column 15, line 22, the number "3" should be deleted

Column 16, line 1, the word "being" should be changed to --and--

Signed and Sealed this

Tenth Day of July, 2007

JON W. DUDAS
*Director of the United States Patent and Trademark Office*